(12) United States Patent
Wisniewski

(10) Patent No.: US 7,494,034 B2
(45) Date of Patent: Feb. 24, 2009

(54) DEVICE FOR APPLYING A WORKING POWER TO A WORKPIECE

(75) Inventor: Horst Wisniewski, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 510 days.

(21) Appl. No.: 10/510,122

(22) PCT Filed: Mar. 6, 2003

(86) PCT No.: PCT/EP03/02320

§ 371 (c)(1),
(2), (4) Date: Nov. 9, 2005

(87) PCT Pub. No.: WO03/084704

PCT Pub. Date: Oct. 16, 2003

(65) Prior Publication Data

US 2006/0130554 A1    Jun. 22, 2006

(30) Foreign Application Priority Data

Apr. 11, 2002   (DE)   .................... 102 15 952

(51) Int. Cl.
*B26F 3/00*      (2006.01)
*B26H 35/10*   (2006.01)
(52) U.S. Cl. ................. 225/103; 225/100; 225/96
(58) Field of Classification Search ............. 72/453.01, 72/453.1, 453.13, 453.18; 225/1, 97, 103, 225/96, 100

See application file for complete search history.

(56) References Cited

U.S. PATENT DOCUMENTS

| 4,754,906 A | 7/1988 | Brovold |
| 5,503,317 A * | 4/1996 | Jones et al. .................. 225/103 |
| 6,386,417 B1 * | 5/2002 | Jones et al. .................. 225/103 |
| 6,474,526 B1 * | 11/2002 | Hahnel et al. ............... 225/100 |
| 6,571,999 B2 * | 6/2003 | Hase ............................. 225/1 |
| 7,318,543 B2 * | 1/2008 | Cavallo ....................... 225/103 |

FOREIGN PATENT DOCUMENTS

| DE | 1950974 A1 | 4/1970 |
| DE | G9210167.4 U1 | 11/1992 |
| DE | 19624385 A1 | 1/1998 |
| DE | 19928540 A1 | 11/2000 |
| EP | 0661125 A1 | 7/1995 |
| GB | 1228089 | 4/1971 |
| JP | 36-15113 | 9/1936 |
| JP | 52-3985 | 1/1977 |
| WO | WO 02/090028 A1 | 11/2002 |

OTHER PUBLICATIONS

Search Report from International Application No. PCT/EP03/02320 mailed Jun. 27, 2003.

* cited by examiner

*Primary Examiner*—David B Jones
(74) *Attorney, Agent, or Firm*—Wolf, Greenfield & Sacks, P.C.

(57) ABSTRACT

The invention relates to a device for applying a working force to a workpiece, using a working cylinder. The device includes a working piston, an actuation chamber that can be supplied with a hydraulic medium, a recirculation chamber that can be supplied with a gaseous medium and a force transmission device that co-operates with the working piston. This allows a transmission or an application of the working force to a workpiece that is as rapid as possible with a technical construction that is as simple as possible.

6 Claims, 3 Drawing Sheets

DEVICE FOR APPLYING A WORKING POWER TO A WORKPIECE

FIELD OF THE INVENTION

The invention relates to a device for applying a working power to a workpiece in order to manufacture or process the workpiece.

PRIOR ART

Devices are well-known from the prior art that comprise a piston-cylinder unit with a working cylinder and a working piston. The working piston divides the working cylinder into an actuation chamber and a return chamber. It is known that both the actuation chamber and the return chamber may be supplied with a hydraulic medium. The working power is transmitted to the workpiece through co-operation between the working piston and a force transmission device.

The European patent EP 066 11 25 describes a device for crack splitting connecting rods. A device of this type comprises, among other things, an actuating device for applying a spreading force onto the spreading wedge and thus onto the workpiece (connecting rod) by means of a hydraulic piston-cylinder unit. In addition, the actuating device includes a accumulator and a control valve arranged between the accumulator and the piston-cylinder unit, by means of which control valve, hydraulic medium stored in the accumulator under pressure may be fed suddenly into the piston-cylinder unit. In order to transmit a working power to the workpiece (connecting rod), the hydraulic medium is fed into the actuation chamber and simultaneously displaces the hydraulic medium in the return chamber. In order to return the device into its starting position, this procedure is reversed, i.e. hydraulic medium is fed into the return chamber and simultaneously the hydraulic medium is displaced from the actuation chamber.

It is known that the quality of crack splitting results, when crack splitting connecting rods, depends, among other things, upon the speed of the crack splitting procedure. For this reason, it has already been proposed in the aforementioned method and device that the control valve be designed as a cartridge valve and that the hydraulic medium be pressurized in an accumulator before feeding into the actuating chamber of the piston cylinder unit.

A further device for crack splitting connecting rods using a force or energy store is disclosed in DE 196 24 385 A1.

DESCRIPTION OF THE INVENTION

It is an object of the invention further to develop a device of the type described above such that given the simplest possible technical construction, the fastest possible transmission of working power onto a workpiece can be realised.

This object is fulfilled by a device having a working cylinder, a working piston, an actuation chamber that can be supplied with a hydraulic medium and situated on one side of the piston, a return chamber that can be supplied with a gaseous medium and situated on the opposite side of the piston, and a force transmission device which cooperates with the working piston.

The invention is based on the idea that the hydraulic medium usual in the prior art, which can be fed into the return chamber, can be replaced by a gaseous medium. The use of a gaseous medium for feeding into the return chamber offers the advantage that the resistance on displacement of the medium from the return chamber during the force transmission procedure may be reduced. This has the advantage that a yet more sudden operating method, and therefore an even more effective transmission of the working power to a workpiece, may be achieved.

Advantageous embodiments are indicated in claims 2 to 6.

An accumulator communicates with the actuation chamber such that the hydraulic medium able to be supplied to the actuation chamber may be stored under pressure in the accumulator. This embodiment has the advantage that the working method of the device is designed to be rapid such that the most sudden possible operation may be achieved. An accumulator can be used which includes a high pressure container whose interior is divided into two chambers by a separation membrane, the lower chamber being filled with hydraulic medium and the upper chamber being filled with a compressed gas, preferably nitrogen.

According to an advantageous embodiment, arranged between the accumulator and the actuation chamber is a control valve, whereby the hydraulic medium stored under pressure in the accumulator may be fed suddenly into the actuation chamber via the control valve. A control valve of this type may be designed in any desired manner. It is essential only that the control valve is conceived such that within a short time-span, i.e. suddenly, a relatively large flow cross-section is available for the hydraulic medium, in order that the hydraulic medium stored in the accumulator may be fed as suddenly as possible into the actuation chamber. It is therefore advantageous if a two-way built-in valve is used as the control valve. Valves of this type are often known in this specialist field as cartridge valves.

According to a preferred embodiment, the workpiece is a connecting rod and the force transmission device is designed such that the connecting rod may be crack split. This has the advantage that, given the simplest possible technical construction, the most rapid crack splitting procedure may be realised. Furthermore, by this operational method, during the crack splitting procedure, a relatively slight plastic deformation of the connecting rod material in the region of the fracture plane is ensured, which approaches very closely to a so-called brittle fracture.

According to a further embodiment, the force transmission device comprises a locally fixed spreading jaw, a movable spreading jaw and a spreading device in the form of a spreading wedge for pushing apart the spreading jaws.

Advantageously, the return chamber additionally comprises a discharge device, so that the gaseous medium may be suddenly displaced from the return chamber. A discharge device of this type may, for instance, be designed as a discharge valve with a large control cross-section, so that the smallest possible back-pressure acts, on the side of the return chamber, against the hydraulic medium fed under pressure into the actuation chamber. It is advantageous in this regard if the control is designed such that the discharge device is already opened when the hydraulic medium under pressure is fed into the actuation chamber.

The invention will now be described, using examples, by reference to the attached drawings, in which.

WAYS TO CARRY OUT THE INVENTION

Figure 1:
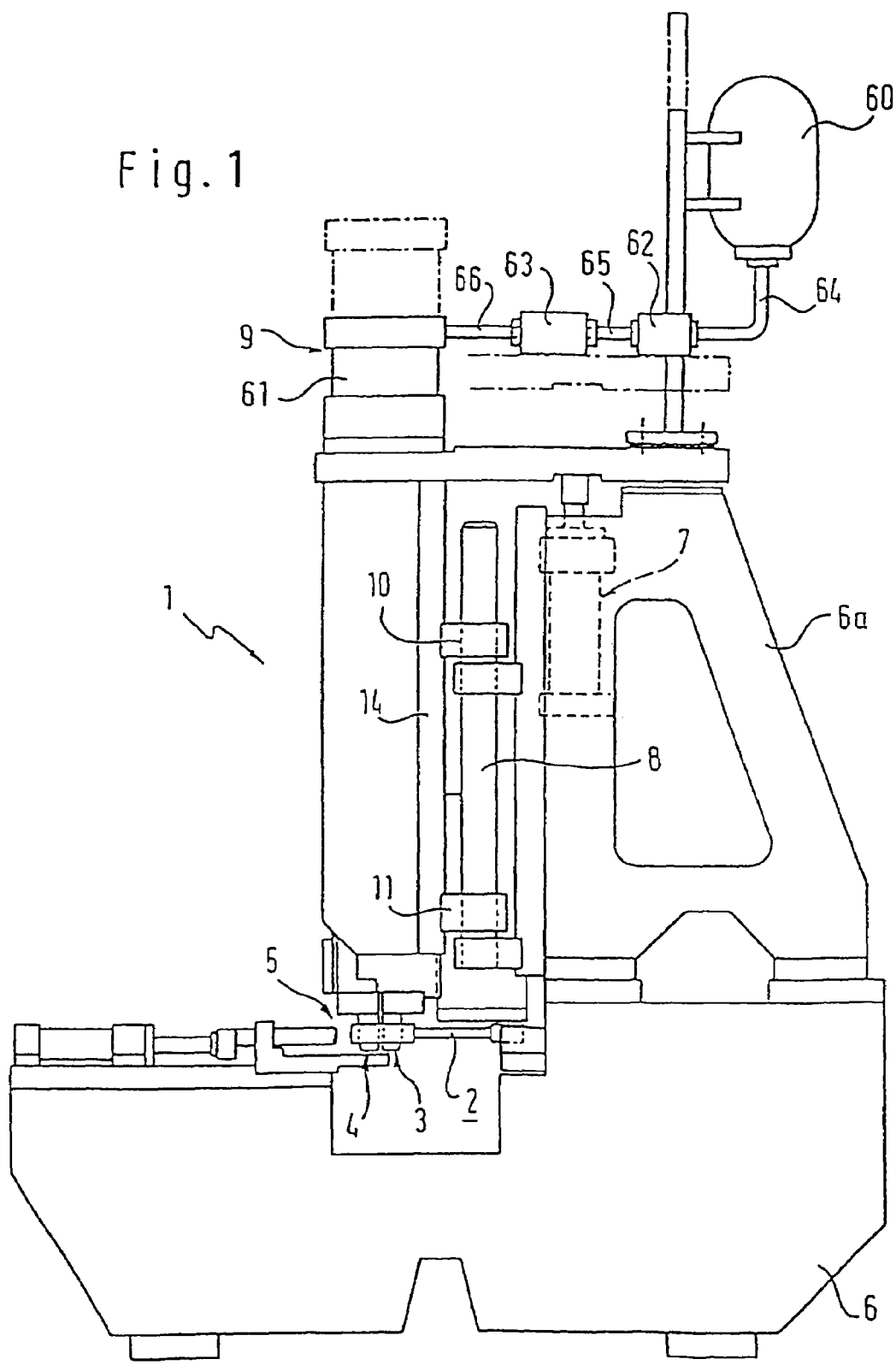
FIG. 1 shows, schematically, a first example embodiment of a device according to the invention in a simplified overall view.

The first example embodiment shown in FIG. 1 of a device 1 according to the invention is built upon a stand lower portion 6, as used in transfer lines. Placed on the stand lower portion 6 is a frame-like stand upper portion 6a, which supports a guide arrangement 8 in the form of a vertical straight-line guiding means. A movable frame 14 is mounted on the straight-line guiding means by means of guide straps 10 and 11, said movable frame being capable of being raised and lowered via a lifting device 7 fixed to the stand upper portion 6a. The movable frame 14 also carries a force transmission device 5 which bears a locally fixed (i.e. directly attached to the movable frame 14) spreading jaw 3 and a movable spreading jaw 4. Furthermore, this force transmission device 5 has a spreading wedge 55 shown in FIG. 2.

The arrangement is such that the locally fixed and the movable spreading jaws of the spreading device 5 can be lowered from above via the lifting device 7 and the movable frame 14 into the large eye of a connecting rod 2, comprising the cap and the rod, arranged in a holder on the stand upper portion, and can be pulled out of it again.

Figure 2:
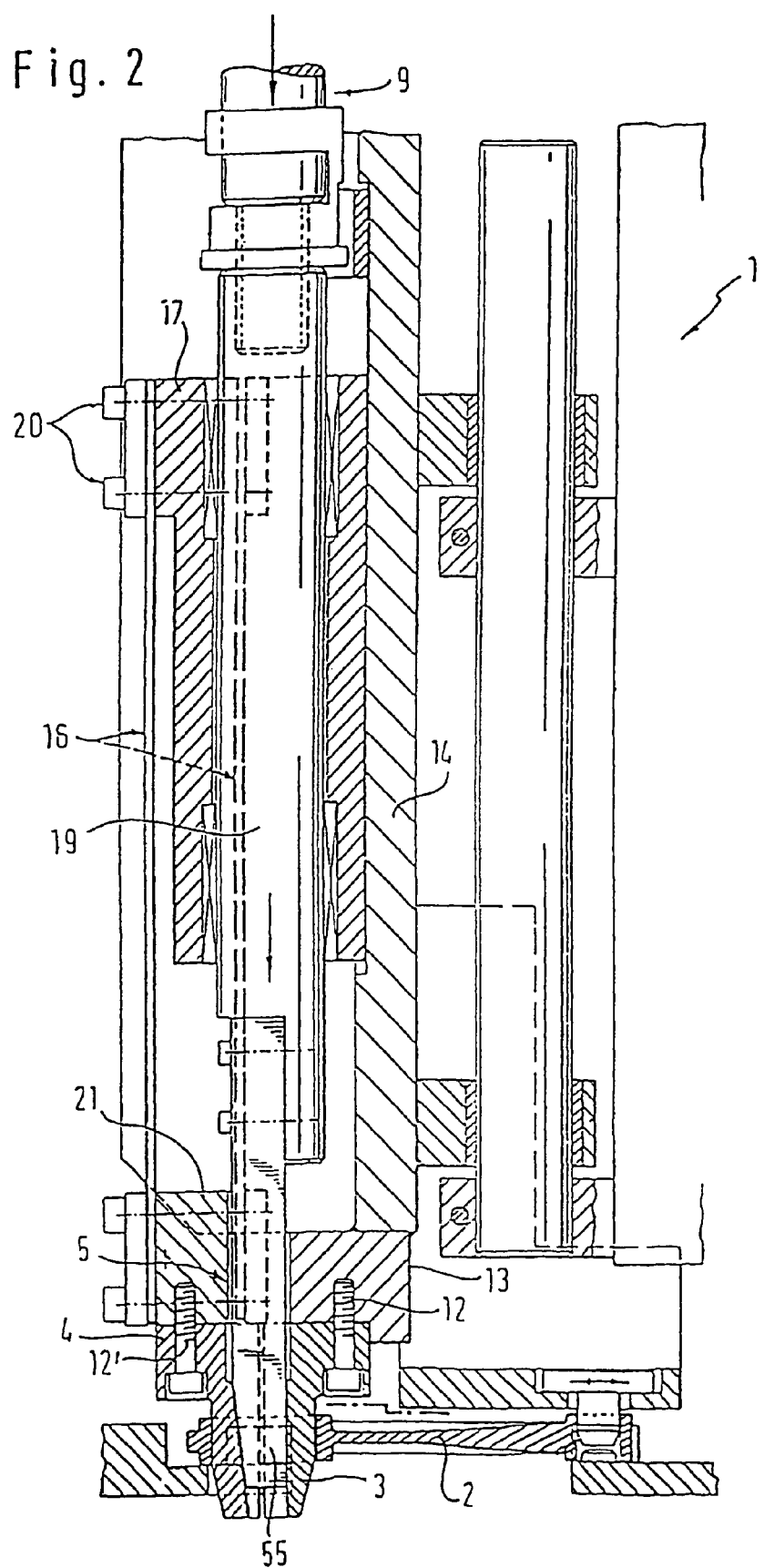
FIG. 2 shows, on an enlarged scale, a partially sectional view of a part of the example embodiment of FIG. 1.

The exact construction of the force transmission device is revealed in FIG. 2. As is evident from FIG. 2, the locally fixed spreading jaw 3 is attached via fixing screws 12 to a fixing socket 13 of the movable frame 14. The movable spreading jaw 4 is attached via fixing screws 12' to a bearing section 21, which is attached via a parallel guide rod arrangement 16 via fixing screws 20 to a holder section 17 representing part of the movable frame 14. Arranged between the locally fixed spreading jaw 3 and the movable spreading jaw 4 is the spreading wedge 55, which is linked to a push rod 19 which cooperates with the working piston 9. The remainder of the construction of the first example embodiment of the device according to the invention, as illustrated in FIG. 2, is described in the German utility model 92 10 197, to the disclosed content of which reference is here expressly made.

The piston cylinder unit 61, shown in FIG. 1, includes a piston 9 linked via a push rod 19 to a spreading wedge 55. Arranged between the accumulator 60 and the piston cylinder unit 61 are a safety device 62 and a control valve 63. The safety device 62 and the control valve 63 are mutually connected, and connected in relation to the accumulator 60 and to the piston cylinder unit 61, with the shortest possible connecting lines 64, 65 and 66 with low hydraulic resistance.

The safety device 62 is a commercially available unit having a shut-off valve and a pressure-relief valve.

Figure 3:
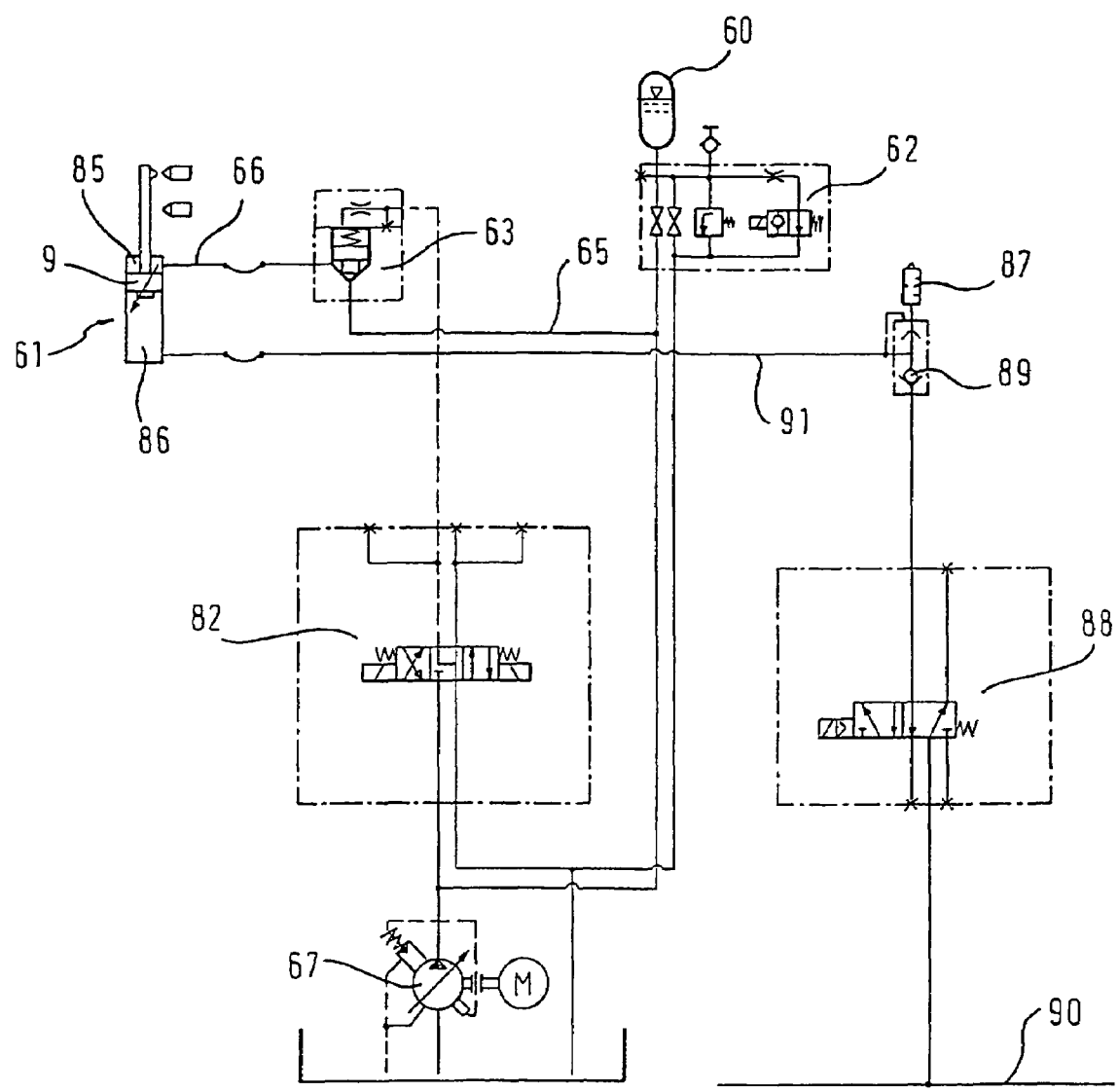
FIG. 3 shows, schematically, a hydraulic layout such as that on which the first example embodiment of the device according to the invention is based.

The hydraulic layout represented in FIG. 3, which is based on the first example embodiment, shows a piston cylinder unit 61 with a piston 9 which divides the piston cylinder unit 61 into an actuation chamber 85 and a return chamber 86. The hydraulic layout also shows the accumulator 60, which communicates with the safety device 62, which in known manner comprises a shut-off valve and a pressure-relief valve.

Connected to the safety device 62 via a line 65 is the control valve 63, which itself communicates with the actuation chamber 85 via the line 66.

As is apparent from FIG. 3, the arrangement also comprises a main pump 67 with which a hydraulic medium may be fed into the accumulator 60 for building up an accumulator power via the line 65 and the safety device 62.

The arrangement also comprises a directional valve 82 with which the control valve 63 can be controlled.

Furthermore, the hydraulic layout shows a compressed air line 90, which is linked by the line 91 via a directional valve 88 and a non-return valve 89 to the return chamber 86. Furthermore, between the directional valve 88 and the return chamber 86, a discharge device 87 is provided.

The procedure is as follows: initially, the accumulator 60 is brought to its operating pressure by the main pump 67. Then, the directional valve 82 opens the control valve 63. Before or simultaneously with this procedure, the discharge device 87 is opened. Since the control valve 63 is designed such that it opens a relatively large flow cross-section within a very short time, the hydraulic medium stored in the accumulator 60 can flow suddenly via lines 64, 65 and 66 into the actuation chamber 85 of the piston cylinder unit 61 and thus suddenly transmit a force to a first side of the piston 9, which in turn cooperates with the force transmission device 5. Since the discharge device 87 is opened, this movement of the piston 9 encounters no noteworthy resistance, so that the force released can be transmitted directly and suddenly via the force transmission device.

Once the force transmission procedure is over, the directional valve 82 opens a discharge device of the actuation chamber, and simultaneously the directional valve 88 opens the connection of the return chamber 86 to a compressed air line 90. The air fed in under pressure transmits a force onto a second side of the piston 9. By this means, the piston 9 is returned to its starting position and the force transmission procedure to the workpiece may be carried out again.

By this means, the force transmission procedure takes place at a fast pace such that an operational method is assured which comes very close to a device operating with a striking weight. Therefore, with devices of the type according to the invention, a high quality force transmission result is achieved with relatively little technical effort.

The invention claimed is:

1. Device for applying a working power to a workpiece, comprising
   a working cylinder,
   a working piston,
   an actuation chamber which is supplied with a hydraulic medium during an operation of applying the working power and which is situated on one side of the piston,
   a return chamber which is supplied with a gaseous medium during an operation of returning the piston and which is situated on the opposing side of the piston,
   a force transmission device cooperating with the working piston, and
   a discharge device designed such that the gaseous medium is displaced suddenly from the return chamber during the operation of applying the working power.

2. The device according to claim 1, wherein
   an accumulator communicates with the actuation chamber, wherein the hydraulic medium is stored in the accumulator under pressure.

3. The device according to claim 2, wherein
   arranged between the accumulator and the actuation chamber is a control valve, wherein the hydraulic medium stored in the accumulator under pressure is fed suddenly via the control valve into the actuation chamber.

4. The device according to claim 1,
   wherein the workpiece is a connecting rod and the force transmission device is designed such that the workpiece is crack split.

5. The device according to claim 4, wherein
   the force transmission device has a locally fixed spreading jaw, a movable spreading jaw and a spreading device in the form of a spreading wedge for pushing apart the spreading jaws.

6. A method for applying power to a workpiece in a device including a working cylinder, a working piston, an actuation chamber situated on one side of the piston and a return chamber situated on an opposing side of the piston, comprising:

supplying the actuation chamber with a hydraulic medium during an operation of applying the working power;

supplying the return chamber with a gaseous medium during an operation of returning the piston; and displacing the gaseous medium from the return chamber suddenly during the operation of applying the working power.

\* \* \* \* \*